(No Model.) 3 Sheets—Sheet 1.
R. EICKEMEYER.
TOOL FOR CURLING BRIMS OF HATS.
No. 360,865. Patented Apr. 12, 1887.
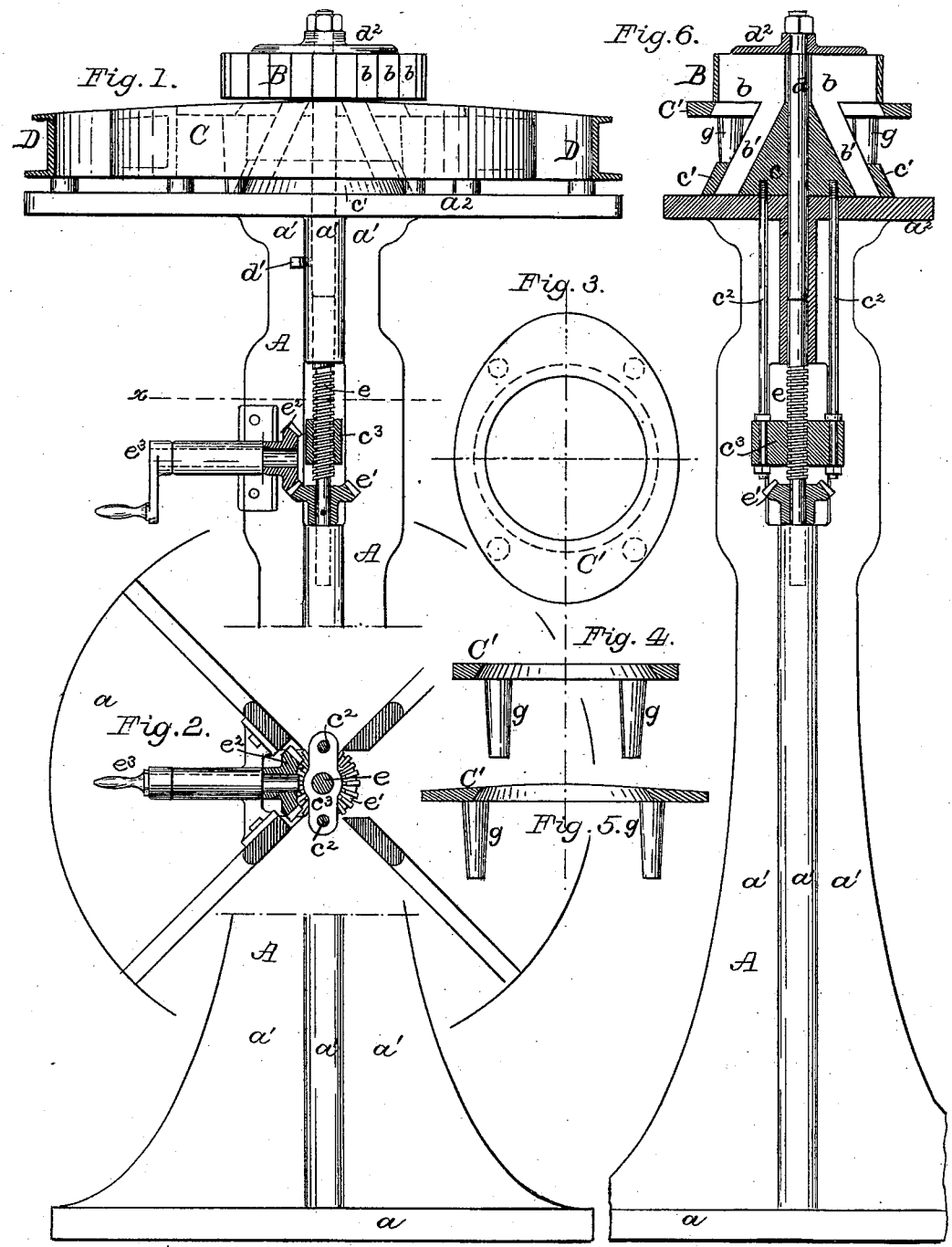
Attest:
Philip F. Larner
Howell Bartle
Inventor:
Rudolf Eickemeyer
By [signature]
Attorney (No Model.)  3 Sheets—Sheet 2.
R. EICKEMEYER.
TOOL FOR CURLING BRIMS OF HATS.
No. 360,865. Patented Apr. 12, 1887.
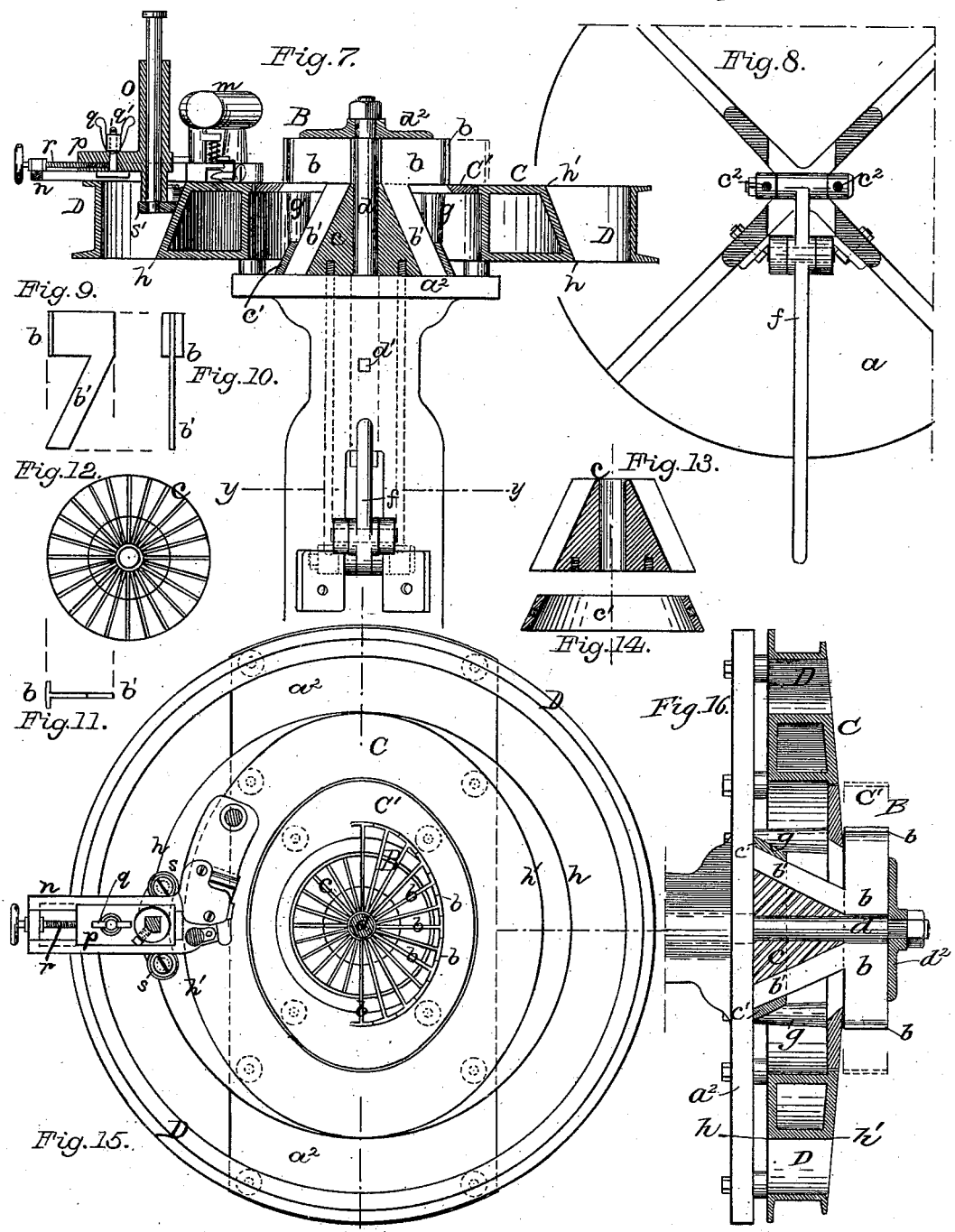

(No Model.) 3 Sheets—Sheet 3.
R. EICKEMEYER.
TOOL FOR CURLING BRIMS OF HATS.
No. 360,865. Patented Apr. 12, 1887.
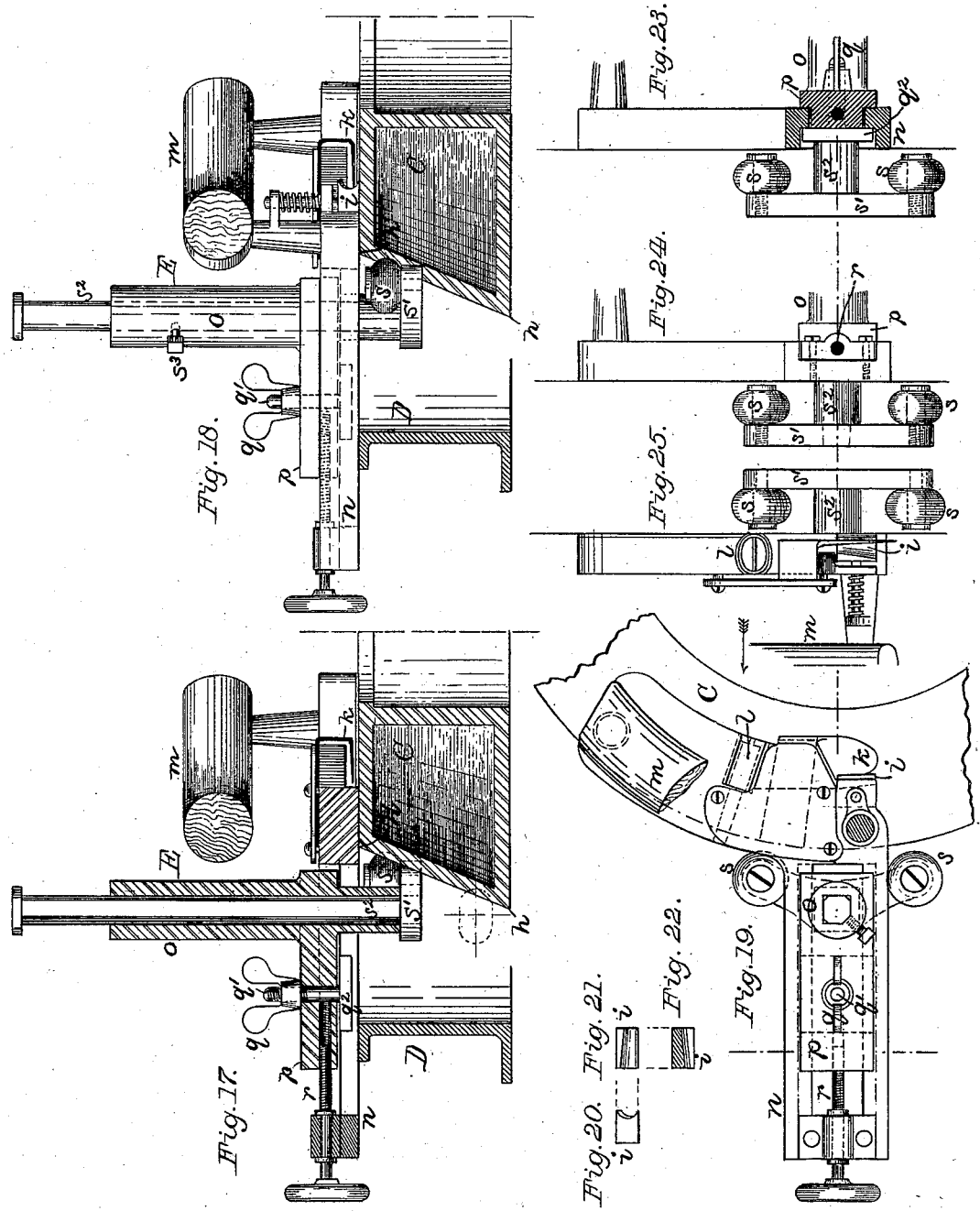
Attest:
Philip F. Larner
Howell Bartte
Inventor:
Rudolf Eickemeyer
By Wm. E. Word
Attorney

UNITED STATES PATENT OFFICE.

RUDOLF EICKEMEYER, OF YONKERS, NEW YORK.

TOOL FOR CURLING BRIMS OF HATS.

SPECIFICATION forming part of Letters Patent No. 360,855, dated April 12, 1887.

Application filed December 19, 1883. Serial No. 115,053. (No model.)

*To all whom it may concern:*

Be it known that I, RUDOLF EICKEMEYER, of Yonkers, in the county of Westchester and State of New York, have invented certain new and useful Improvements in Tools for Curling the Brims of Hats; and I do hereby declare that the following specification, taken in connection with the drawings furnished and forming a part of the same, is a clear, true, and complete description of the several features of my invention.

My said improvements relate to that class of brim-curling tools which embody a heating and supporting bed or table for the hat-brim, a hat-block for centering a hat with its brim properly located on said table, and a curling device operated by hand, by which the edge of the brim is turned inwardly and ironed down into a set or fixed condition, a gage and pattern or guide-plate by which the curling device is properly guided, so as to curl the edges with uniformity and provide for a symmetrical outline of the curled brim.

As an instance of prior tools of this class I will refer to the brim-curler shown and described in the patent of Parker, No. 242,686, June 7, 1881, and also to the patent of Parker and Nichols No. 233,543, October 19, 1880, wherein a more elaborate machine is shown and described. In all prior brim-curling machines known to me a pattern-plate or guide-plate has been employed having an oval outline corresponding with the desired brim outline in each case, said plate being frequently shifted for one larger or smaller, or of different outline, to suit the particular requirements in each case; and one object of my present improvement is to obviate this necessity for changing the pattern or guide plate, and this I accomplish by combining with the supporting-bed a guide or pattern plate which at different horizontal planes has different oval outlines; and I provide the curling device with one or more vertically-adjustable guide-rollers, which can therefore be made to engage with any desired portion of the pattern-plate, and thereby enable the curling of the edge of a brim with a corresponding oval outline.

Another object of my invention is to afford a perfect support for the hand-curler, especially at its rear end or shank, so that as it is carried around the brim it can, in all its radial positions, be held practically horizontal, and this I accomplish by a wholly novel supporting-rail, which surrounds the heating and supporting bed and guide-plate, and said rail has a variable surface contour, which corresponds with the surface of the supporting-bed, which, as usual, is so formed as to properly support a brim arched as usual from front to rear of the hat. Prior curling tools or machines have in some instances embodied expansible blocks for centering hats of all sizes, as, for instance, as disclosed in the aforesaid Letters Patent No. 233,543; but the expansible sections of said blocks have been actuated by a system of bell-crank levers, occupying much space, and thereby limiting the number of sections, and I have further improved these tools or machines by organizing therein an expansible hat-block composed of radially-sliding sections actuated by a slotted cone-block similar to the hat-block disclosed by me in my Letters Patent No. 141,338, July 29, 1873, and I have also provided a hand-crank, gears, and a screw for controlling the cone-block.

To more particularly describe my invention, I will refer to the accompanying three sheets of drawings, wherein—

Figure 1, Sheet 1, illustrates the brim-curling table and block partially in side view and partially in vertical central section, and having a portion of the table-standard removed. Fig. 2 is a horizontal section through the standard on line $x$, Fig. 1, looking downward upon the base of the standard. Figs. 3, 4, and 5 illustrate a supplemental brim-bed, which immediately surrounds the hat-block, the same being shown in top view and also in lateral and longitudinal vertical section. Fig. 6 illustrates the standard in another side view and discloses the supplemental brim-table, the expansible hat-block, its cone-block, and its crank and gear in vertical central section. Fig. 7, Sheet 2, is a vertical central section of the entire brim-table, the hat-block, supporting-rail, and a curling device thereon, and the standard is also shown in side view in connection with a lever for actuating the cone-block. Fig. 8 is a horizontal section of Fig. 7 on line $y$. Figs. 9, 10, and 11 are varied views of the hat-block sections detached. Fig. 12 is a top view of the slotted cone-block detached. Fig. 13 is a vertical central section of said cone-block. Fig.

14 is a sectional view of a conical band or ring, which is attached to the cone-block and operates therewith for controlling the sliding sections. Fig. 15 is a top view of Fig. 1, with the handle of the brim-curler removed, and also with the cap-plate of the block and one-half of the block-sections removed. Fig. 16 is a vertical central section of the table, &c., on a line at right angles to the section-line of Fig. 1. Figs. 17 and 18, Sheet 3, are similar views of the hand-curler and a portion of the brim-table and supporting-rail, the curler being shown in vertical section in Fig. 17, and with a portion of its handle broken away in both figures. Fig. 19 is a top view of the parts shown in Figs. 17 and 18. Figs. 20 to 25, inclusive, are detailed views of the curler.

The frame A embodies a circular base-plate, $a$, standard $a'$, composed of four radiating webs, and a cap-plate, $a^2$, as clearly indicated on Sheet 1.

The hat-block B, for centering a hat, rests upon the cap-plate $a^2$, the central portion of the top of which is smooth and supports the several hat-block sections $b$, which have angular shanks $b'$ occupying radial slots in the conical block $c$, which has secured to it at its base a conical band or ring, $c'$, which serves to close the outer lower portion of the slots of the block. The block is provided with a central spindle, $d$, which occupies a central hole in the standard, and is secured therein by a set-screw, $d'$.

On top of the spindle is a crown-plate, $d^2$, firmly secured in position, so that its lower surface is truly parallel with the cap-plate $a^2$ of the frame, and serves to prevent the rising of the block-sections $b$, while freely permitting their radial movements, which are obtained by the lifting or lowering of the conical block $c$, however that may be done. As shown in Figs. 1 and 2, said conical block is mounted by means of two rods, $c^2$, on a tapped cross-head, $c^3$, which is centrally occupied by a rotative screw, $e$, provided with a bevel-pinion, $e'$, which is meshed by a pinion, $e^2$, on the crank-shaft $e^3$. By turning the crank one way or the other, the hat-block is expanded or contracted, and I graduate the pitch of the screw so that, say, one turn of the crank in either direction will enlarge or contract the block just one size, as in certain prior machines constructed by me containing my expansible hat-block. In lieu of the crank, gearing, and screw a lever may be employed, as shown at $f$, Figs. 7 and 8, Sheet 2. The details in construction of the block and its operating mechanism are clearly illustrated in Figs. 1 and 2, Sheet 1, and in the several figures on Sheet 2.

Surrounding the lower edge of the movable sections of the hat-block B there are main and auxiliary brim-supporting beds C and C', separately constructed and applied. The auxiliary supporting-bed C' surrounds the base of the block proper, is oval in outline, and is supported by its four legs $g$ upon the cap-plate $a^2$ of the frame, and it is insulated from the main brim-bed C by an intervening space at all points, because said main bed is heated, and it is undesirable to unduly heat the brim of a hat adjacent to the "square" or junction of the brim and side crown.

The main brim-bed is made hollow, so as to operate as a steam-jacket; or it may be otherwise so constructed that it can be properly heated for softening the brim of a hat sufficiently for the curling operation.

The brim-supporting surfaces of both beds conform to each other, and have such a surface contour as corresponds with the surface of the under side of the hat-brims to be curled—i. e., said beds are curved with the lowest points at each end and the highest in the middle at each side, as clearly indicated in Figs. 4, 5, 7, and 16.

My main brim supporting and heating bed C differs from all others known to me, in that its peripheral surface serves as a variable pattern-plate or guide-plate for a hand-curler, so that no changes of pattern-plates are required, as heretofore, for enabling operations upon hats with brims of varied oval outline. As seen in Fig. 15, the outline of the main bed C is circular at its lower edge, $h$, and oval at its upper edge, $h'$, and that therefore at each of its sides said bed is inclined as seen in Fig. 7, and at its ends it is straight, as seen in Fig. 16. I have thus provided for guiding a curler during its movements around a hat-brim in a great variety of ellipses, as will be hereinafter more fully described.

Although I have shown in substance a variable guide or pattern plate, which is integral with the supporting-bed, as a simple, economical, and otherwise desirable mode of construction, it is obvious that a variable pattern-plate possessing substantially the same area and contour of guiding-surface may be successfully employed, if separately constructed and applied to the edge of the brim-bed, or even supported directly by the upper surface of the cap-plate, and it is to be understood that such variations in construction will not involve any departure from certain portions of my invention. It is, however, also to be understood that I do not broadly claim a pattern plate or block presenting at its periphery various elliptical outlines in different horizontal planes, such having been heretofore employed in connection with stretching-tongs in hat-blocking machines, and also in connection with cutting-tools for trimming hat-brims; but I believe I am the first to organize such a pattern-plate for use with curling-tools or as a part of brim-curling apparatus, and with means whereby the curler can be held evenly and truly upon the brim-bed while moving said curler around a hat-brim.

As another novel feature I have provided a supporting-rail for the rear end of the shank of the curler, so that pressure may be freely applied to the curler without liability of deranging its desirable position with relation to the upper or working surface of the main brim-bed. This supporting-rail is shown at D, Figs. 1, 7, 15, 16, 17, 18, and 19. It is a circular rail surrounding the main brim-bed C and concentric therewith, but affording sufficient intervening space for freely accommodating depending portions of the hand-curler E, which serve as a gage, and are shown in Fig. 7, and also in detail in the several figures on Sheet 3.

This curler, as usual, embodies a lifting and folding device, $i$, (shown in Figs. 18 and 19, and detached in three views in Figs. 20, 21, and 22,) an edge-guide, $k$, (shown in Figs. 17, 18, and 19,) and a pressing-roller, $l$, these parts being so organized that the edge of a hat-brim is lifted, turned inwardly, and pressed flatly as the curler is made to travel around a brim, the requisite pressure being meantime applied by hand upon the handle $m$.

The frame of the curler has a rearwardly-extended tail-piece or shank, $n$, longitudinally slotted, as shown, for the reception of a vertical tube or sleeve, $o$, provided with a base-block, $p$, which is fitted so as to slide in the slot of the shank, and to be secured at any desired point therein by the thumb-nut $q$, which is tapped to a clamp-screw, $q'$, having a large square head, $q^2$, which loosely occupies the lower and widest portion of the slot in the shank, all as clearly indicated in several figures on Sheet 3. An adjusting-screw, $r$, is rotatively housed in a bearing fixed to the rear end and top of said shank, and the rear end of the base-block $p$ is drilled and threaded for the reception of the adjusting-screw.

The guiding-gage, which limits the movement of the curler to a prescribed path around the main bed, embodies two rollers, $s$, which are mounted upon vertical studs at each end of a horizontal bracket, $s'$, secured to or forming a part of a square vertical spindle, $s^2$, which occupies the vertical sleeve $o$, and can be secured therein at any desired height by means of a set-screw, $s^3$.

The outer end of the shank rests upon the top of the supporting-rail, and, as the surfaces of the latter and the brim-bed exactly conform, it will be seen that during its movements around the brim-bed the curler will always be firmly maintained in a practically horizontal position, and consequently the operation of the curling devices will be absolutely uniform and produce uniform results.

The variation in the height of the gage-rollers obviously varies the line of the path traversed by the curler, and the adjusting-screw enables the curling devices to be located at any desired distance from the base of the hat-block, thus providing for all of the several variations requisite in brim-curling operations.

Having thus described my invention, I claim as new and desire to secure by Letters Patent—

1. The combination, with the hollow brim supporting and heating bed, of the hat-block composed of radially-sliding sections, the vertically-sliding cone-block, and means for lifting and lowering said cone-block, substantially as described.

2. The combination of a brim-curling tool having a vertically-adjustable gage attached thereto and depending therefrom, a brim supporting and heating bed, and a guide for said gage affording various elliptical or oval outlines in different horizontal planes, substantially as described.

3. A hollow brim supporting and heating bed affording at its peripheral surface a variety of elliptical or oval outlines in different horizontal planes, substantially as described, whereby said bed serves to support and heat hat-brims preparatory to curling, and also as a variable guide for a brim-curler, as set forth.

4. The combination, with the brim-supporting bed, of the annular supporting-rail surrounding the bed, and having a surface conforming to the surface of said bed, substantially as described, whereby the tail-piece or shank of a brim-curler is firmly supported at its outer end during its movement around the bed, as when curling the edge of a hat-brim.

5. The combination of the main bed for supporting and heating a hat-brim for curling, the centering-block, and the auxiliary brim-bed surrounding the base of said block and insulated from the main bed, substantially as described, whereby a hat at the square or junction of the side crown and brim is prevented from being unduly heated, as set forth.

6. A brim-curling tool provided with a vertically-adjustable guiding-gage which is attached thereto and pendent therefrom, substantially as described.

RUDOLF EICKEMEYER.

Witnesses:
HENRY OSTERHELD,
GEORGE NARR.